United States Patent

Frey

[15] 3,688,258
[45] Aug. 29, 1972

[54] INSTALLATION FOR THE INDICATION OF A FULL BRAKING AND OF THE STOPPAGE IN A MOTOR VEHICLE

[72] Inventor: Egon Frey, Stuttgart-Degerloch, Germany

[73] Assignee: Daimler-Benz Aktiengesellschaft, Stuttgart-Unterturkheim, Germany

[22] Filed: Nov. 7, 1969

[21] Appl. No.: 874,880

[30] Foreign Application Priority Data

Nov., 1968 Germany..........P 18 07 754.8

[52] U.S. Cl....................................340/67, 340/81
[51] Int. Cl. ..............................................B60q 1/38
[58] Field of Search..........340/62, 66, 67, 71, 72, 81

[56] References Cited

UNITED STATES PATENTS

| | | | |
|---|---|---|---|
| 2,090,332 | 8/1937 | O'Neil | 340/62 UX |
| 3,008,121 | 11/1961 | Ellithorpe | 340/72 X |
| 3,014,200 | 12/1961 | Tewksbury | 340/71 |
| 3,281,786 | 10/1966 | Leichsenring | 340/62 X |
| 3,324,454 | 6/1967 | Haratani | 340/71 |
| 3,329,936 | 7/1967 | Nallinger | 340/71 |
| 3,492,638 | 1/1970 | Lane | 340/66 |
| 3,535,680 | 10/1970 | Onksen et al. | 340/67 |

FOREIGN PATENTS OR APPLICATIONS 1,359,829  3/1964  France............................71/

*Primary Examiner*—Kenneth N. Leimer
*Attorney*—Craig, Antonelli & Hill

[57] ABSTRACT

A system for indicating the full braking and the stoppage of a motor vehicle in which the turn-indicator lights, normally adapted to be intermittently energized by the turn indicator, are continuously energized when the brake pressure reaches a predetermined level; the brake lights are also energized if the vehicle comes to a standstill regardless of the condition of the brake pedal.

10 Claims, 1 Drawing Figure

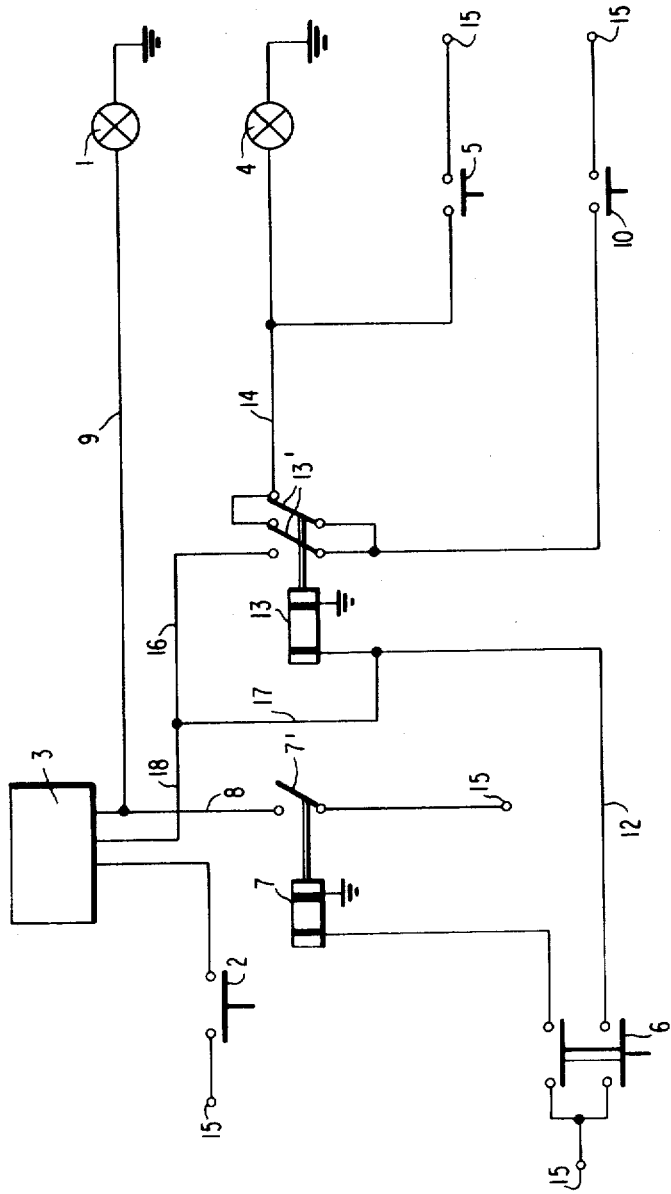
INVENTOR
EGON FREY

INSTALLATION FOR THE INDICATION OF A FULL BRAKING AND OF THE STOPPAGE IN A MOTOR VEHICLE

The present invention relates to an installation for indicating a full braking and the stoppage in a motor vehicle which is equipped with brake lights and blinker or flashing lights as directional signal indicators.

It is known by the installation according to the German Pat. No. 1,076,515 to utilize the brake lights as warning lights and to put into operation a blinker unit for the warning lamps by means of a relay, and more particularly during a slow drive of the motor vehicle or during its stoppage. The energizing circuit of the relay winding is closed only in the center position, i.e., with a straight drive whereas during a turn or direction indication, it is interrupted at the turn indicator switch and is thereby intended to enable a unilateral flashing or blinking, i.e., an intermittently operable light. An automatic indication during sudden braking during the turning is therefore not possible with this prior art system, as also the simultaneous indication by means of the brake lamps may not appear sufficiently clear to the other traffic participants. The separate arrangement of warning lights, in contradistinction thereto, does not appear appropriate under the limited installation conditions and with the additional expenditures in cable material required. This separate arrangement also cannot be realized for space reasons additional expenditures in cable material required. This separate arrangement also cannot be realized for space reasons Known in the prior art are also additional lamps or lights for producing a light band during the full braking of a motor vehicle. Additionally, a switching system of light bands exists which become narrower with increasing velocity. Finally, blinking or flashing brake lights are also utilized, in which the blinking or flashing frequency increases noticeably to the eye with increasing brake pressure.

The one-type of known installations require additonalllights whereas the changing blinker or flash sequences cause confusion for the remaining traffic and may cause accidents.

The present invention starts with the fact that during a full braking of the motor vehicle the inherent function, properly speaking, of its blinker— or flashing lights; namely, the indication of the intended driving direction, cannot be noticed so that this already present installation, can be utilized for the solution of the task of rendering noticeable or indicating the braking condition. Consequently, the present invention is concerned with the aim to void the aforementioned disadvantages and to create, with the use of already existing parts and switching means, a simple and operationally reliable indicating installation.

The underlying problems are solved with the installations of the aforementioned type in accordance with the present invention in that the blinker or intermittently operable lights are adapted to be connected with the current source, such as the battery, by a pressure switch arranged in parallel to the directional-signal transmitter circuit. This pressure switch responds only to high braking pressure (full braking) and is arranged in by-passing relationship of the flasher relay. The brake lights are adapted to be connected with the current source by a stoppage switch arranged in parallel to a brake light switch actuated by the brake. This pedal stoppage switch closes during stoppage of the vehicle drive shaft.

In an advantageous type of construction of the present invention, the arrangement is so made that the pressure switch is arranged in the energizing circuit of a switching relay closing when energized by current, which switching relay is arranged in a line between the current source and the flasher relay, from which branches off the line to the blinder lights. It follows therefrom that during a full braking with the turn indicator lights turned on for intermittent flashing in a predetermined direction on one vehicle side, both the indicator lights of the other vehicle side B light up with a continuous light. However, with a decreasing brake pressure, the previously engaged blinker lights again continue to transmit intermittent signals.

Finally, a further feature of the present invention resides in that the switch closing during standstill of the vehicle is associated with or coordinated to the tachometer shaft. An easy installation of the device is possible thereby.

The bright lighting-up of the blinker lights installed for the most part near the brake lights provides continuously energized steady light which is noticeable to a particular extent by all traffic participants. They may therefore initiate in good time appropriate measures against collisions, particularly against impact accidents. The installation according to the present invention has the advantage of simple individual parts that can be readily manufactured. A particular advantage resides in the subsequent installation possible at any time into existing motor vehicles.

Accordingly, it is an object of the present invention to provide an installation for the indication of full braking and/or of the stoppage of a motor vehicle which avoids by simple means the aforementioned shortcomings and drawbacks encountered in the prior art.

Another object of the present invention resides in an installation for indicating full braking and/or stoppage of a motor vehicle which automatically indicates the sudden braking of the vehicle, even while making a turn in such a manner as to be readily noticeable by other traffic participants.

A further object of the present invention reside in a light-indicating installation of the type described above which requires relatively little space, involves no substantial additional expenditures and is capable of ready assembly and installation into the vehicle.

A still further object of the present invention resides in an installation for indicating the full raking and/or stoppage of motor vehicle which utilizes relatively simple parts that can be manufactured relatively inexpensively.

Another object of the present invention resides in an installation of the type described above which can be readily built into a motor vehicle at any time, i.e., even subsequently to the initial assembly of the vehicle.

These and further objects, features, and advantages of the present invention will become more obvious from the following description when taken in connection with the accompanying drawing which shows, for purposes of illustration only, one embodiment in accordance with the present invention, and wherein:

The single FIG. is a schematic circuit diagram of one embodiment in accordance with the present invention shown for only one motor vehicle side for the sake of simplicity.

Referring now to the single figure of the drawing, intermittently operable or blinker lights 1 are arranged at the vehicle, in a conventional manner both in front and in the rear on both sides thereof. Turn indicating signals can be given by means of these lights 1, and more particularly, manually after engagement of a switch 2 of conventional construction which intermittently energizes the blinder lights 1 by way of a conventional flasher relay 3. Switch 2 and flasher relay 3 are arranged such that the blinker lights 1 for each of the respective sides can be selectively engages to provide flashing intermittent light signals at the respective selected side of the vehicle. That is, switch 2 can assume three positions corresponding to: left side blinker lights flashing, right side blinker lights flashing, and neither right nor left side blinker lights flashing.

Parallel to the flasher relay 3 is connected a contact 7' of the switching relay 7, adapted to close upon energization, in a line 8 between the current source 15, such as a battery or the like, and the flasher relay 3. The line 9 to the blinker lights 1 branches off from this line 8. A conventional pressure switch 6 is disposed in the current energizing circuit of the switching relay 7 which is adjusted to the maximum brake pressure—or slightly below the same. The bake pressure switch 6 therefore responds only during a full braking. In that case, however, the blinker lights 1 are energized independently of the position of the switch 2 and of the flasher relay 3, i.e., they light up continuously. That is, all of tee blinker lights 1 at both sides of the vehicle are continuously lighted by the current flow via source 15, switch 7', line 8, and 9. These blinker lights are continuously lighted during high pressure braking irrespective of whether they had been intermittently flashing as a conventional turn indicator immediately prior to the high pressure braking. During a normal braking, the switch 6 does not respond. Similarly, the switch 6 releases again when the brake pressure decreases from a full braking operation. Consequently, if the blinker lights 1 at one side of the vehicle had been engaged previously by the switch 2, then they assume again their pre-existing function. The brake lights 4 light up during depressing of the brake pedal by way of the brake light switch 5 closed thereby in a conventional manner. In order to render clearly noticeable the stopped vehicle, particularly also in heavily travelled roads such as throughways or autobahns, a switch 10 connected with the shaft of the tachometer (not shown) is arranged parallel to the pedal-actuated switch 5 in the brake light energizing circuit which is open during the drive but closes immediately with a stopped vehicle, i.e., a vehicle that stands still. The switch 10 is connected by way of contacts 13' of a relay 13 with the line 14 leading to the brake lights 4. The brake lights 4 therefore also continue to light up with a stopped vehicle, even when the pedal-actuated switch 5 opens again. With a stopped vehicle, brake lights 4 are lighted, irrespective of the position of the relay 13, since one of the relay contacts 13' is always engaged.

The pressure switch 6 is also connected in the current-energizing circuit 12 of the relay 13. During full braking, as already explained, the relay contacts 7' and 13' are closed, i.e., displaced toward the left as viewed in the drawing. If the vehicle in this condition comes to a standstill, i.e., if the switch 10 closes, the the relay 13 continues to be energized by way of the still closed lights contacts 13' and the lines 16 and 17—which form a second parallel energizing circuit for the relay 13—even if subsequently the brake pressure is relieved or eliminated. In contradistinction thereto, the relay 7 releases. The blinker lights no longer receive current due to a continuously closed contact 7' but still receive only pulses by way of the flasher transmitter 3 which is energized by way of the lines 18 and 16, the left contact 13' and the switch 10. That is, blinker lights 1 at both sides of the vehicle are flashed intermittently immediately following a stop completed under full braking pressure.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are within the scope of those skilled in the art.

I claim:

1. An installation for indicating a full braking and stoppage of a motor vehicle comprising brake light means, blinker light means as directional turn indicators, circuit means for energizing said blinker light means by way of a directional signal transmitter circuit means and a flasher relay means, the blinker light means being operably connectable with a current source by way of a pressure switch means responding only to high brake pressures, said pressure switch means being arranged in parallel to the directional signal transmitter circuit means in by-passing relationship of the flasher relay means, the brake light means being operably connectable with the current source by way of a further switch means arranged in parallel to a pedal-actuated brake light switch means, and wherein means are provided for closing said further switch means in response to the stoppage of the vehicle drive shaft.

2. An installation according to claim 1, characterized in that the pressure switch means includes a brake pressure switch and a first switching relay means, said brake pressure switch being arranged in the energizing circuit of the switching relay means for closing its contact means upon energization thereof, said contact means being arranged in a line between the current source and the flasher relay means, a line leading to the blinker light means branching off from said first mentioned line.

3. An installation according to claim 2, characterized in that the further switch means closing during stoppage of the vehicle includes means responsive to the stoppage of a tachometer shaft.

4. An installation according to claim 3, characterized in that the brake pressure switch is arranged in the energizing circuit of a second switching relay means whose contact means, upon closing of the pressure brake switch, close a parallely connected energizing circuit for said second switching relay means which includes the line leading to the further switch means, and in that a line leads from this last-mentioned energizing circuit to the flasher relay means in bypassing relationship to the directional signal transmitter circuit means.

5. An installation according to claim 2, characterized in that the brake pressure switch is arranged in the energizing circuit of a second switching relay means whose contact means, upon closing of the pressure brake switch, close a parallelly connected energizing circuit for said second switching relay means which includes the line leading to the further switch means, and in that a line leads from this last-mentioned energizing circuit to the flasher relay means in bypassing relationship to the directional signal transmitter circuit means.

6. An installation according to claim 1, characterized in that the further switch means closing during stoppage of the vehicle includes means responsive to the stoppage of a tachometer shaft.

7. An installation for indicating full braking and stoppage of a motor vehicle comprising: current source means, braking means, brake light means, a brake light switch for selectively connecting the current source means to the brake light means upon actuation of the braking means, blinker light means operable as directional turn indicators, a turn indicator switch for selectively connecting the current source means to the blinker light means, a flasher means selectively engageable between the current source means and the blinker light means for intermittently energizing said blinker light means, first circuit means for selectively connecting said blinker light means to said current source means in by-passing relationship to said flasher means in response to full braking pressure on said braking means, second circuit means for selectively connecting said brake light means to the current source means in response to stoppage of the vehicle, and third circuit means for connecting said blinker light means to said current source means by way of said flasher means in response to means including means responsive to stoppage of the vehicle, said third circuit means being in bypassing relationship to said turn indicator switch.

8. An installation according to claim 7, further comprising a brake pressure switch responsive only to substantially full braking pressure on the braking means, characterized in that said first circuit means includes a first relay having said brake pressure switch in its energizing circuit, said first relay having a contact for connecting the current source means to the blinker light means in bypassing relationship to the turn-indicator switch and the flasher means, and in that said second circuit means includes a stoppage switch means closing in response to stoppage of the vehicle, said stoppage switch means operatively connecting the current source means to said brake light means upon stoppage of the vehicle, said stoppage switch means being arranged in parallel with the brake light switch.

9. An installation according to claim 8, characterized in that said third circuit means includes a second relay having said brake pressure switch in its energizing circuit, said third circuit means including said stoppage switch means, said second relay having a contact for closing a circuit portion between said stoppage switch means and said flasher means.

10. An installation according to claim 8, characterized in that said stoppage switch means closing during stoppage of the vehicle includes means responsive to the stoppage of a tachometer shaft.

* * * * *